United States Patent [19]

Shirkey

[11] Patent Number: 5,092,043
[45] Date of Patent: Mar. 3, 1992

[54] STRAWBERRY CORER/STEMMER TOOL

[76] Inventor: Carolyn M. Shirkey, 4455 Rockhill Terr., Kansas City, Mo. 64110

[21] Appl. No.: 655,666

[22] Filed: Feb. 14, 1991

[51] Int. Cl.$^5$ .............................................. A47J 25/00
[52] U.S. Cl. .................................. 30/113.1; 30/113.003; 30/314
[58] Field of Search ................ 30/113.1, 113.2, 113.3, 30/314, 315, 316

[56] References Cited

U.S. PATENT DOCUMENTS

| | | |
|---|---|---|
| 185,902 | 1/1877 | Fallows . |
| 293,940 | 2/1884 | Brock . |
| 1,206,403 | 11/1916 | Benedico . |
| 1,293,351 | 2/1919 | Creasey . |
| 1,371,948 | 3/1921 | Szotz .................................. 30/316 |
| 1,530,822 | 3/1925 | Gibson . |
| 1,794,800 | 3/1931 | Smith .............................. 30/113.3 |
| 2,282,673 | 5/1942 | Peterson ............................ 30/316 |
| 2,557,191 | 6/1951 | King . |
| 2,686,690 | 8/1954 | Kushnir ............................. 30/316 |
| 4,949,459 | 8/1990 | Noble ............................... 30/113.1 |

Primary Examiner—Frank T. Yost
Assistant Examiner—Hwei-Siu Payer
Attorney, Agent, or Firm—Litman, McMahon & Brown

[57] ABSTRACT

A strawberry corer/stemmer tool comprises a tubular portion and a handle. The tubular portion has a partial bore connecting an insertion end of the tubular portion to a rear opening. The bore is slightly smaller than the transverse dimensions of a stem end of a core of a strawberry such that the core is urged from the strawberry. The core being removed from a subsequent strawberry forces the core removed from a preceding strawberry through the bore, with the result that removed cores are ejected through the rear opening. The wall edge of the insertion end is blunted such that strawberry leaves remaining attached to the previously removed core are similarly urged into the bore and are subsequently ejected with the previously removed core attached thereto.

5 Claims, 1 Drawing Sheet

U.S. Patent    Mar. 3, 1992    5,092,043
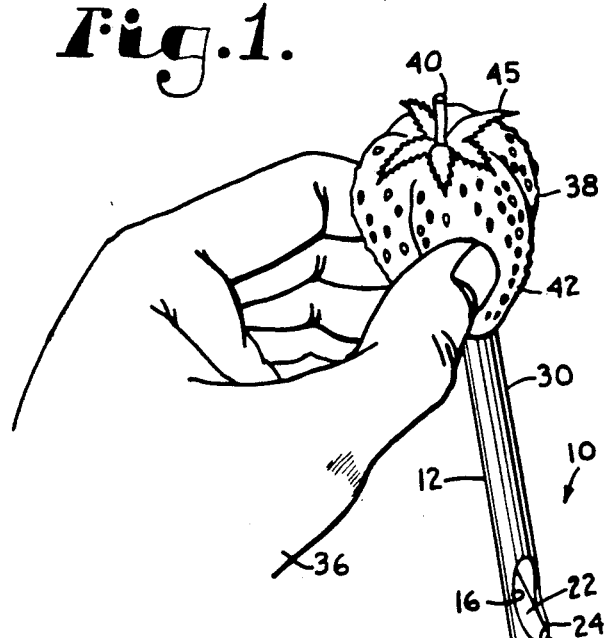
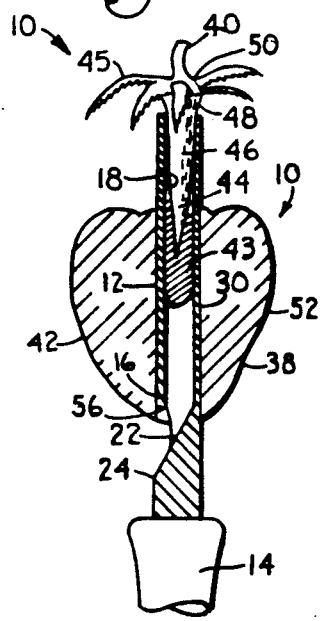
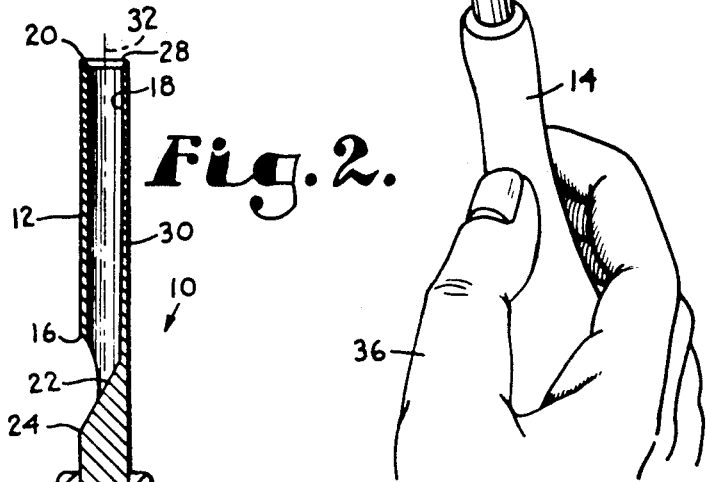
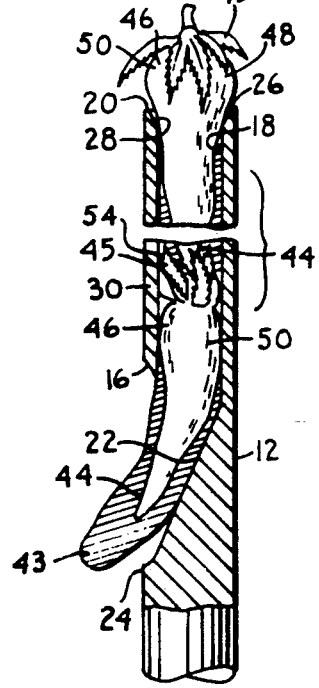
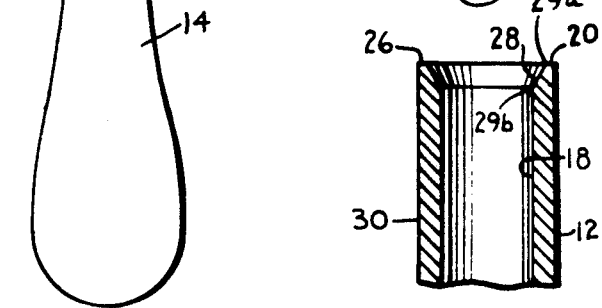

– 1 –

STRAWBERRY CORER/STEMMER TOOL

BACKGROUND OF THE INVENTION

The present application relates to a strawberry corer and stemmer tool and a process for rapidly and efficiently removing a core and a stem from a strawberry.

Unbeknownst to many strawberry lovers, a far greater delicacy awaits their palate by removal of a core from each of those strawberries prior to ingestion thereof. Leaving those cores intact not only robs much of the otherwise available flavor but also places greater demands on sweetening requirements for food preparations using strawberries.

Many devices exist in the prior art for removing cores, such as from apples, etc. However, such corers have not adequately addressed such applications for strawberries which generally are shipped with leaves attached to the stems. The normal approach is usually removal of the stem and leaving a core intact to be consumed along With the remainder of the strawberry. To also remove the cores from the strawberries would introduce an additional food preparation step. By reducing the stemming and coring to a single preparation step, prior art devices do not provide for such simultaneous removal of a core and a leafy stem whereby the leaves are removed intact without leaving severed leaf fragments embedded in the prepared strawberry.

To remove such cores from more than a few strawberries at a time is no small undertaking as strawberries are by their very nature a relatively soft, malleable item with a pleasing and appetizing appearance, which is easily marred or destroyed by rough handling, such as by attempting to remove cores therefrom by improper methods.

What is needed is a tool and a method for easily and effectively removing cores having leafy stems from strawberries to obtain the benefits attendant therewith while, at the same time, preserving their appetizing characteristics and appeal.

SUMMARY OF THE INVENTION

A strawberry corer/stemmer tool is provided to remove a core and a stem from a strawberry. The tool includes a cylindrically shaped tubular portion having an insertion end and a handle end. The handle end is rigidly secured to a handle.

The insertion end has an axial partial bore which connects the insertion end to a rear opening. Many strawberries have leaves attached to the stem and it is desirable for the leaves to be removed with the core rather than remain in whole or part with the cored berry. Consequently, a thin wall surrounding the bore at the insertion end has a radially outer portion which is blunted to avoid severing leaves that are attached to a removed core and a radially inner portion which is tapered inwardly to assist with urging the stem end of a removed core into the bore.

In use, the insertion end of the tool is inserted through a bottom end of a first strawberry and is directed toward a stem of the strawberry. As the insertion end of the tool traverses the strawberry, a tail end of a core being removed is received into the bore until the wider, stem end of the core being removed lodges in the distal end of the tubular portion such that the core is removed from the strawberry.

Upon similarly inserting the tool through a bottom end of a second strawberry, a tail end of a core in the second strawberry generally provides sufficient resiliency, in conjunction with the inwardly tapering radially inner portion of the distal end of the insertion end, to urge the stem end of the first core into the bore. The tail end of the second strawberry core is then received into the bore urging the first strawberry core therealong until the second strawberry core has been similarly removed. If leaves remain attached to the first strawberry core, those leaves slide past the blunted radially outer portion of the distal end of the insertion end without being severed and wrap around the tail end of the second strawberry core then being removed.

As subsequent strawberry cores are received into the bore of the tool, previously removed cores are ejected outwardly through the rear opening by a slanted ejector wall spaced adjacent to the rear opening.

OBJECTS AND ADVANTAGES OF THE INVENTION

Therefore, the objects of the present invention are: to provide a tool and a method for removing a core from a strawberry; to provide such a tool and a method for simultaneously removing a core and a leafy stem from a strawberry; to provide such a tool and a method for preserving the appetizing appeal of a strawberry while removing a core or a core and a leafy stem therefrom; to provide such a tool and a method which removes a minimal quantity of the non-core portion of a strawberry as the core portion thereof is removed; and to generally provide a tool which is relatively easy to use, simple to maintain, inexpensive to manufacture, and which generally performs the requirements of its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a strawberry corer/stemmer tool according to the present invention, showing a user coring and stemming a strawberry.

FIG. 2 is a side elevational view of the strawberry corer/stemmer tool with portions broken away to show detail thereof.

FIG. 3 is an enlarged and fragmentary view of the strawberry corer/stemmer tool, showing an insertion end of a tubular portion.

FIG. 4 is a side elevational view of the strawberry corer/stemmer tool, showing a leafy core urged from a strawberry and with portions broken away to show interior detail.

FIG. 5 is an enlarged and fragmentary side elevational view of the strawberry corer/stemmer tool, showing cores removed from two strawberries and with portions broken away to show detail thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 10 generally refers to a strawberry corer/stemmer tool in accordance with the present invention, as shown in FIGS. 1-5. The tool 10 comprises an open ended tube Or tubular portion 12 and a handle 14.

The tubular portion 12 is generally annularly or cylindrically shaped and is constructed of stainless steel, rigid plastic, or other suitable material. The tubular portion 12 includes a radially outward extending rear opening 16 and an axial, partial bore 18 connecting the rear opening 16 with an insertion end 20 of the tubular portion 12.

The bore 18 terminates in an ejector wall 22. The ejector wall 22 is located adjacent to the handle side of the rear opening 16 and tapers forwardly from a rearward extremity 24 of the rear opening 16, as shown in FIG. 2. The fore-and-aft dimension of the rear opening 16 is such that the minimum cross-sectional area provided between the ejector wall 22 and the edge of the rear opening 16 is not less than the radial cross-sectional area of the bore 18.

The insertion end 20 has a blunted leading edge on a radially outer portion 26 thereof and a following shoulder on a radially inner portion 28 thereof tapering inwardly toward the bore 18, as shown in FIG. 3. A first transition edge 29a between the radially outer portion 26 and the radially inner portion 28 is eased or rounded to facilitate urging material into the bore 18 as hereinafter described. Also, a second transition edge 29b between the radially inner portion 28 and the bore 18 is similarly eased or rounded.

In one application of the present invention, the tubular portion 12 had a length of approximately 4 inches and an outer diameter of 5/16-inch, and the bore 18 had a diameter of ¼-inch, leaving a wall 30 having a width of 1/32-inch. The ejector wall 22 was oriented at approximately 30° relative to a longitudinal axis 32 of the tubular portion 12.

The handle 14 is generally constructed of mahogany, or other suitable material, and has an axial partial bore 34 to interferingly receive and rigidly secure the tubular portion 12, as shown in FIG. 2. It is foreseen that the tubular portion 12 may also be secured to the handle 14 by gluing or the like. Further, it is foreseen that the handle 14 could be formed integrally with the tubular portion 12, such as by injection molding, or the like.

In use, a person holds a strawberry 38 in one hand 36 and the handle 14 of the tool 10 in the other hand 36, as shown in FIG. 1. The insertion end 20 of the tubular portion 12 is then gently urged through the bottom of the strawberry 38 directly toward a stem 40 of the strawberry 38. Due to the relatively small diameter of the tubular portion 12, a minimal quantity of desired pulp 42 of the strawberry 38, such as that designated by the numeral 43 in FIG. 4, is wasted by being forced into the bore 18 of the tubular portion 12.

As the insertion end 20 is urged through the strawberry 38, a tail end 44 of a core 46 of the strawberry 38 is received into the bore 18 of the tubular portion 12. Generally, a stem end 48 of the core 46 of the strawberry 38 has a cross-sectional area which is slightly greater than the cross-sectional area of the bore 18, with the radial dimensions of the core 46 generally gradually diminishing from the stem end 48 to the tail end 44. As a result, most of the core 46, having transverse dimensions less than the diameter of the bore 18, is received into the tubular portion 12 while the stem end 48, having transverse dimensions greater than the diameter of the bore 18, resists being received into the bore 18. Such resistance is generally sufficient to allow the stem 40 with any leaves 45 attached thereto and the core 46 to be urged from the strawberry 38, as designated by the numeral 50 in FIG. 4, without significantly damaging the pulp 42 of the strawberry 38 thereabout. The removed core 50 can then be plucked from the bore 18 and discarded, and the tubular portion 12 then withdrawn from the now core-less strawberry 38, designated by the numeral 52 in FIG. 4.

If the stem 40 has been previously removed from the strawberry 38 prior to removing the core 46 as hereinbefore described, the profile of the stem end 48 of the core 46 is usually too small to conveniently pluck the core 46 from the bore 18. In that case, the tubular portion 12 is withdrawn from the core-less strawberry 52, with the core 46 which has been removed therefrom retained within the bore 18. If preferred, sufficient frictional forces usually exist between the core 50, even with the leaves 45 attached thereto, such that the tubular portion 12 can be withdrawn from the core-less strawberry 52 while retaining the core 50 in the bore 18.

If the core 50 which has been removed from the strawberry 38 is plucked from the bore 18, then removing the core 46 from a second one of the strawberries 38 is simply a repeat performance. However, if the core 50 removed from a first one of the strawberries 38 is not plucked from the bore 18, then the resiliency of the pulp 42 of the second one of the strawberries 38 is generally sufficient to urge the protruding stem end 48 of the core 50 which had been removed from the first one of the strawberries 38 toward the tubular portion 12, with the shoulder 28 squeezing the stem end 48 radially inwardly such that it slides into the bore 18, as shown in FIG. 5.

As the insertion end 20 is thrust farther into the second one of the strawberries 38, the core 50 removed from the first one of the strawberries 38 is forced along the bore 18 toward the handle 14 until the tail end 44 of the core 50 contacts the ejector wall 22 and, being pliable, is forced outwardly through the rear opening 16, as shown in FIG. 5. The insertion end 20 of the tubular portion 12 is sufficiently spaced from the rear opening 16 such that the strawberry 52 does not interfere with the core 50 being ejected from the rear opening 16.

For those instances where the leaves 45 remain attached to the core 50 removed from a first one of the strawberries 38, the leaves 45 generally wrap around the tail end 44 of the core 46 being removed, as indicated by the numeral 54 in FIG. 5. The blunt edge 26 minimizes the risk of severing the leaves 45 as the leaves 45 are forced into the bore 18 by the core 46 being removed.

After removal of the cores 46, the core-less strawberries 52 may be prepared and served as any other strawberries 38, but without the otherwise bland contribution of the cores 46. If desired, a cavity 56 remaining in the core-less strawberries 52 may be filled with a variety of gourmet delicacies to suit one's palate.

It is to be understood that while certain forms of the present invention have been illustrated and described herein, it is not to be limited to the specific forms or arrangement of parts described and shown.

What is claimed and desired to be secured by Letters Patent is as follows:

1. A tool for removing a core from a strawberry, comprising:
    (a) a tubular portion having an insertion end, a handle end, a partial bore, and a rear opening; said partial bore connecting said insertion end with said rear opening; said bore having a cross-sectional area which is dimensioned slightly smaller than that of a strawberry core at the widest portion thereof, such that a strawberry core being subsequently removed will urge a previously removed strawberry core into said bore;
    (b) said tubular portion insertion end being blunted and inwardly tapered such that strawberry leaves attached to a previously removed strawberry core are not severed as that core is urged into said bore by a strawberry core being subsequently removed; and
    (c) a handle rigidly secured to said handle end of said tubular portion.

2. The tool according to claim 1 wherein:
    (a) said tubular portion has an outside diameter of about 5/16 inch.

3. The tool according to claim 1 wherein:
    (a) said tubular portion has an inside diameter of about ¼ inch.

4. The tool according to claim 2 wherein:
    said tubular portion has a wall thickness of about 1/32 inch.

5. A tool for sequentially removing cores from each of a plurality of strawberries, comprising:
    (a) a cylindrically shaped tubular portion having an insertion end and a handle end; said tubular portion having a rear opening and an axially extending partial bore connecting said insertion end with said rear opening; said partial bore having a diameter dimensioned slightly larger than a stem end of a strawberry core such that a first removed strawberry core resists being received into said bore but such resistance is sufficiently minimal that the first removed core is urged into said bore by a second removed core; said tubular portion having a wall surrounding said bore with a radially outer edge blunted at said insertion end; said insertion end being tapered inwardly to bias a first core into said bore when urged by a second core;
    (b) an ejector wall spaced adjacent said rear opening such that the cores passing along said bore from said insertion end toward said handle end are ejected radially outwardly through said rear opening; and
    (c) a handle rigidly secured to said handle end of said tubular portion.

* * * * *